United States Patent [19]
Bruns et al.

[11] Patent Number: 5,529,447
[45] Date of Patent: Jun. 25, 1996

[54] COMBINED HEADER TRANSPORT VEHICLE

[75] Inventors: Mark W. Bruns; Wesley W. Bruns, both of Gibbon, Minn.

[73] Assignee: May-Wes Manufacturing, Inc., Gibbon, Minn.

[21] Appl. No.: 345,521

[22] Filed: Nov. 28, 1994

[51] Int. Cl.$^6$ ..................................................... B61D 3/16
[52] U.S. Cl. .................................... 410/2; 410/44; 410/156
[58] Field of Search .............................. 410/2, 4, 44, 45, 410/156

[56] References Cited

U.S. PATENT DOCUMENTS

| 3,353,862 | 11/1967 | Tormalen | 410/2 |
| 3,655,218 | 4/1972 | Taylor | 410/44 |
| 4,371,299 | 2/1983 | Cain et al. | 410/44 |
| 4,476,667 | 10/1984 | Moss | 56/119 |
| 4,770,577 | 9/1988 | Farris | 410/2 |
| 4,834,598 | 4/1989 | Bruns | 410/2 |
| 5,374,082 | 12/1994 | Smith | 410/2 |

FOREIGN PATENT DOCUMENTS

| 17778 | 2/1981 | Japan | 410/44 |
| 774982 | 10/1980 | U.S.S.R. | 410/2 |

Primary Examiner—Karen B. Merritt
Assistant Examiner—Gregory A. Morse
Attorney, Agent, or Firm—Burd, Bartz & Gutenkauf

[57] ABSTRACT

A vehicle for transporting a grain combine header and a row crop header of an agricultural harvesting implement having bolsters connected to wheels and a longitudinal tube extended between and connected to the bolsters. A longitudinal head rest extends between and is located above the bolsters. Swing arm assemblies mounted on the bolsters support the head rest for movement from an up position to a down position. Holders mounted on the tube are adapted to engage a portion of the header when the header is located on the head rest.

24 Claims, 5 Drawing Sheets

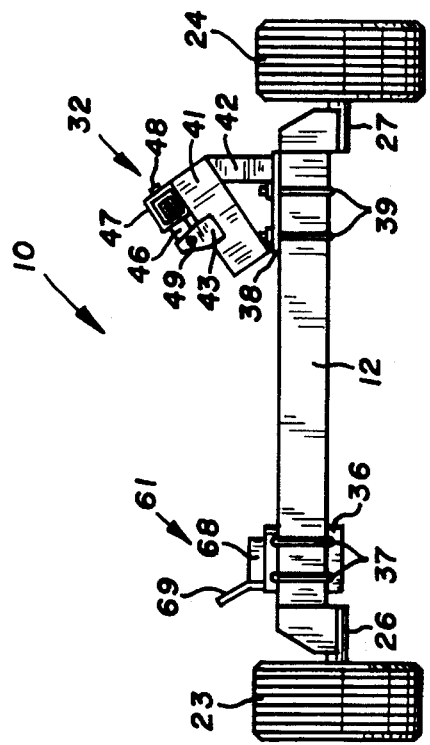
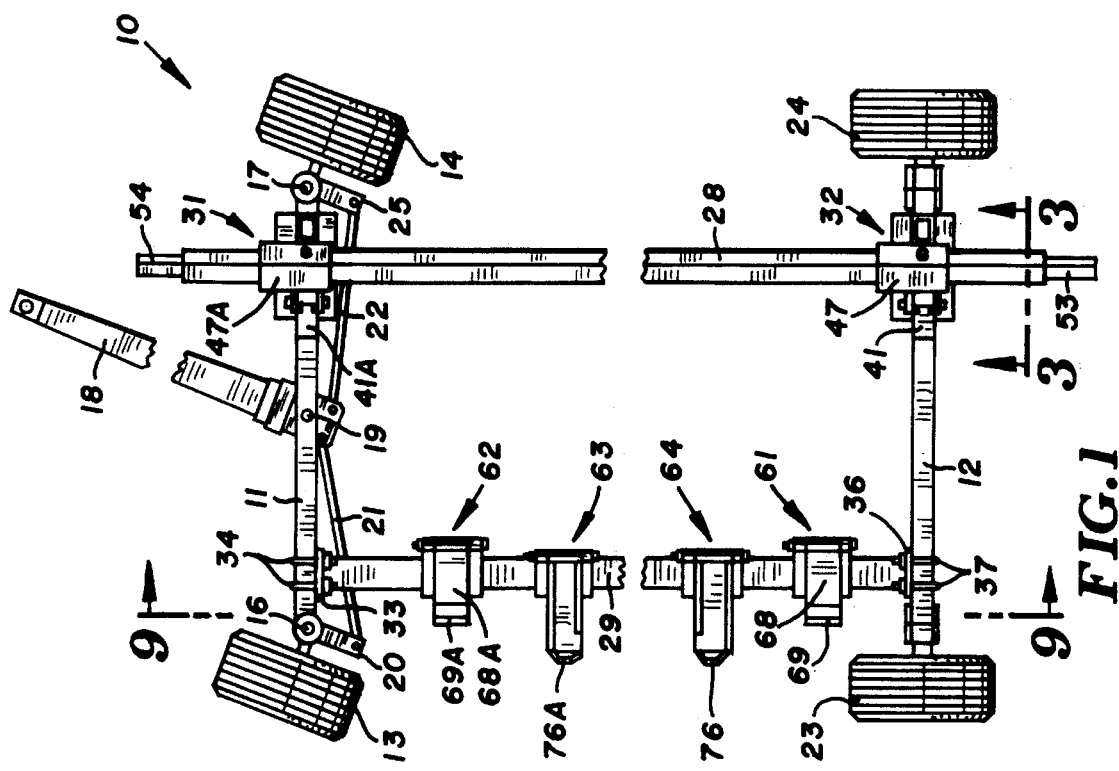
FIG. 2
FIG. 1

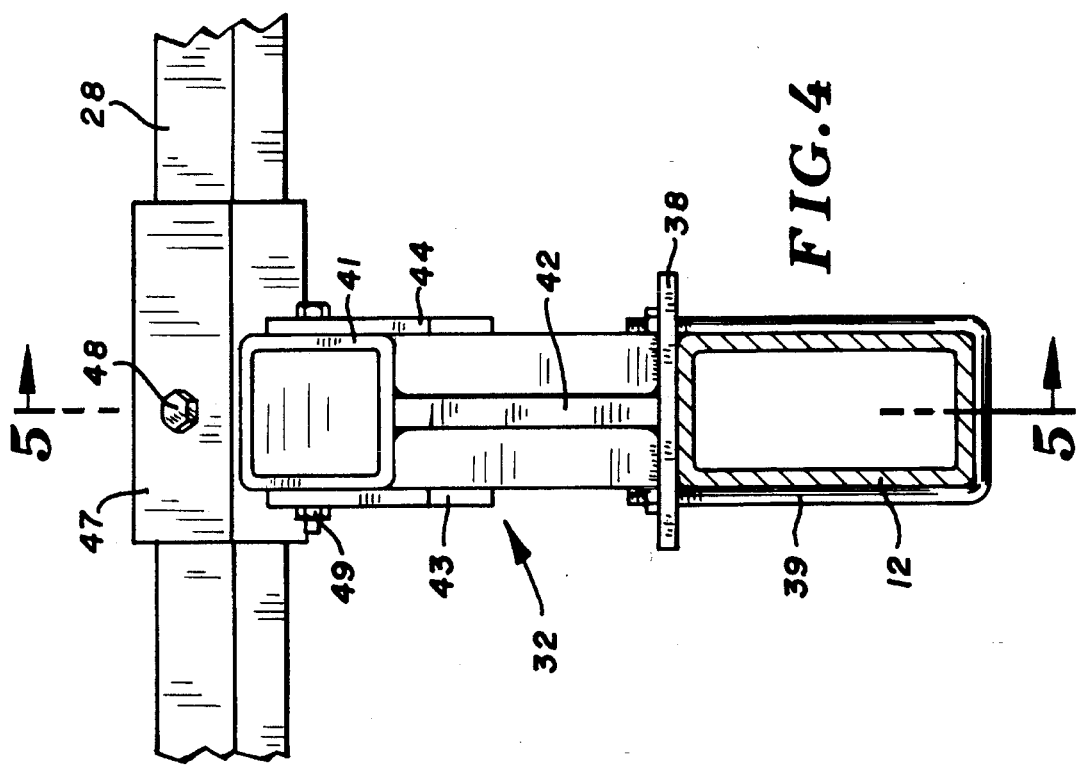
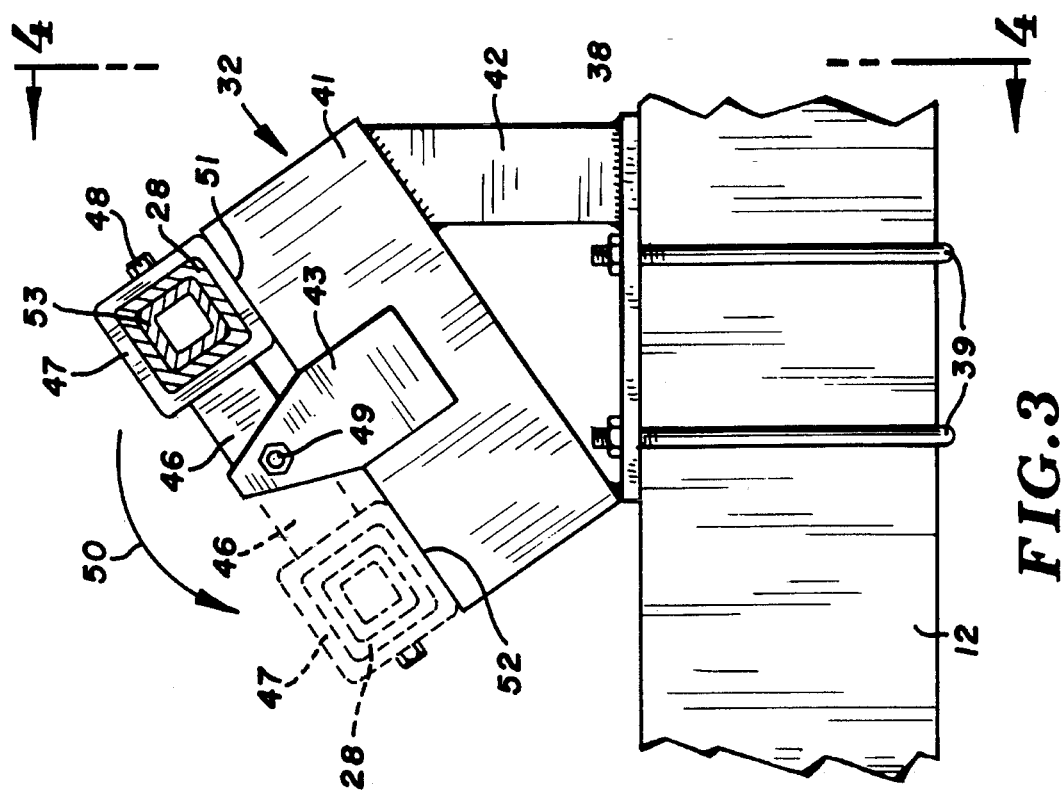

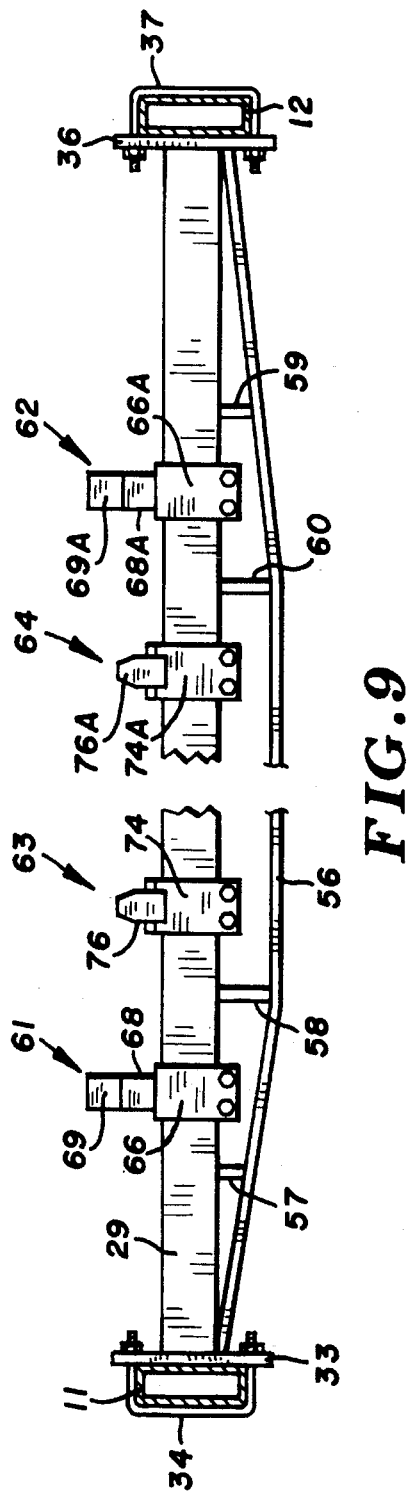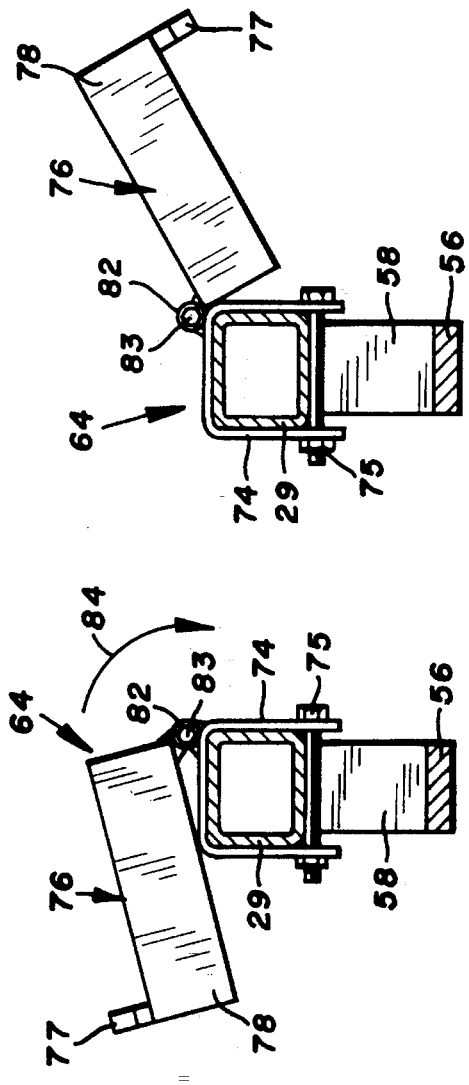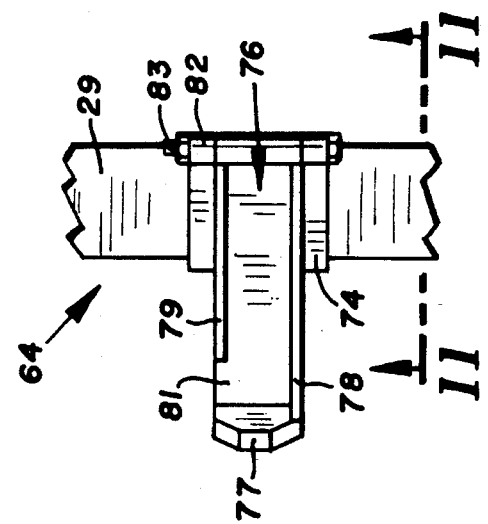

COMBINED HEADER TRANSPORT VEHICLE

FIELD OF INVENTION

The invention relates to a vehicle for transporting a combine header. The vehicle is a trailer adapted to accommodate a grain header and a row crop header of agricultural crop harvesting implements.

BACKGROUND OF THE INVENTION

Agricultural crop harvesting implements, called self-propelled combines, have wide headers that pick up and cut the crops for delivery to a separating unit. The wide headers must be removed from the combine vehicle to permit the combine to be transported down a roadway or lane from field to field. Wagons have been developed to mount and carry combine headers. An example of a combine header carrier for a transport vehicle is disclosed by W. W. Bruns in U.S. Pat. No. 4,834,598. The transport vehicle is a conventional trailer that includes a reach assembly connecting front and rear bolsters that are associated with front and rear wheels. The bolsters serve as supports for both the back stops and the transverse support beam that hold the header. The back stops are not longitudinally adjustable relative to the bolsters. A linkage is used to adjust the vertical height of the header support rail. The back stop is transversely adjustable on a support beam attached to the bolster. The adjustments must be made to permit the carrier to accommodate different sizes and types of combine heads. The present invention is a further improvement of a vehicle to transport grain combine headers and row crop headers.

SUMMARY OF THE INVENTION

The invention is a header trailer used to support and transport a grain header and a row crop header of combines having different sizes and shapes with a minimum of adjustment, time and labor. The vehicle includes a head rest and a support tube connecting front and rear transverse bolsters. The headers are positioned on the head rest and the support tube so that the length of the header is aligned with the longitudinal extent of the vehicle to allow the vehicle carrying the header to be transported along roads through gates and narrow locations. Swing arm assemblies mounted on the bolsters support the head rest for movement from an up position to a down position. Holders mounted on the support tube accommodate portions of the headers when located on the head rest. A first set of holders are used to support a combine grain header when the head rest is in the up position. A second holder having a shoe is used to support a row crop header when the head rest is in the down position.

A preferred embodiment of the header trailer has a transverse front bolster and a transverse rear bolster connected with a longitudinal support tube and a longitudinal head rest. Wheels connected to opposite ends of the bolsters movably support the trailer on the ground. Swing arm assemblies connect opposite portions of the head rest to the front and rear bolsters. Each swing arm assembly has an upwardly and outwardly inclined body attached to a plate that is connected to a bolster. Upright ears secured to opposite sides of the body are located adjacent an arm. A horizontal longitudinal pivot member pivotally connects the arms to the ears. A sleeve, secured to the outer end of the arm, accommodates the head rest. A fastener secures the head rest to the sleeve. The arm is movable between up and down positions to relocate the head rest between up and down locations. The head rest can be manually moved between its up and down locations without removing any parts or making adjustments to the existing structures. The holders mounted on the support tube are laterally adjustable on the tube to accommodate different types and sizes of headers. One or more stop holders mounted on the support tube are used to accommodate a grain header. The stop holders are moved to an inoperative position to allow shoe-type supports adjustably mounted on the support tube to accommodate a row crop header.

DESCRIPTION OF DRAWING

FIG. 1 is a foreshortened top plan view of the header trailer of the invention;

FIG. 2 is an enlarged rear elevational view of the header trailer of FIG. 1;

FIG. 3 is an enlarged sectional view taken along the line 3—3 of FIG. 1;

FIG. 4 is a sectional view taken along the line 4—4 of FIG. 3;

FIG. 9 is an enlarged fragmentary sectional view taken along the line 9—9 of FIG. 1;

FIG. 10 is a top plan view of a row crop shoe assembly mounted on the support tube;

FIG. 11 is a sectional view taken along the line 11—11 of FIG. 10 showing the shoe assembly in the up position;

FIG. 12 is a sectional view similar to FIG. 11 showing the shoe assembly in the down position;

DESCRIPTION OF THE PREFERRED EMBODIMENT

Figure 6:
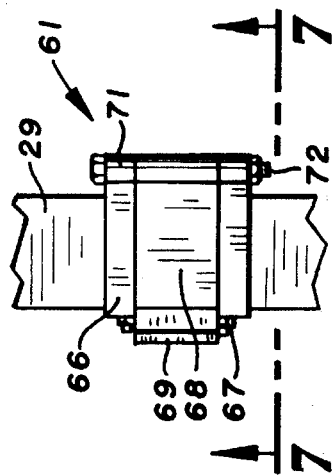
FIG. 6 is an enlarged top plan view of a grain header stop assembly mounted on the support tube.

Referring to FIG. 1, there is shown a vehicle generally known as a header trailer, indicated generally at 10, used to selectively support a grain header and row crop header of a combine. A header is positioned on the vehicle so that the length of the header is aligned with the longitudinal extent or length of the vehicle. This allows the header and vehicle to be transported along roads, through gates and narrow locations.

Header trailer 10 has a transverse front bolster 11 and a transverse rear bolster 12. A pair of front wheels 13 and 14 are connected to opposite ends of the front bolsters with upright spindles 16 and 17. A forwardly-directed tongue 18 is pivotally connected with a pivot pin 19 to the center of bolster 11. Tie rods 21 and 22 connect the inner end of tongue 11 to arms 20 and 25 associated with wheels 13 and 14 whereby when the tongue is laterally moved, wheels 13 and 14 move about the upright axes of the spindles 16 and 17 thereby steering vehicle 10.

A pair of rear wheels 23 and 24 are located adjacent opposite ends of rear bolster 12. Outwardly-directed axles 26 and 27 secured to opposite ends of rear bolster 12 rotatably support rear wheels 23 and 24. Wheels 13, 14, 23 and 24 support the vehicle for movement along the ground, roads and like support surfaces.

Bolsters 11 and 12 are longitudinally spaced from each other with rear wheels 23 and 24 tracking front wheels 13 and 14. Bolsters 11 and 12 are connected together with a longitudinal head rest 28 and a longitudinal support tube 29. Swing arm assemblies, indicated generally at 31 and 32, connect opposite portions of head rest 28 to bolsters 11 and 12. Vehicle 10 does not have a conventional wagon reach.

As shown in FIGS. 1 and 9, support tube 29 is an elongated rigid beam that extends longitudinally between bolsters 11 and 12. Tube 29 is located in the horizontal plane of bolsters 11 and 12. Tube 29 is connected to a first plate 33 that accommodates U-bolts 34 that connect plate 33 and the forward end of tube 29 to the left side of bolster 11. A rear plate 36 is secured to the rear end of tube 29 and attached to the left side of bolster 12 with a pair of U-bolts 37. Tube 29 is longitudinally reinforced with a longitudinal strap or member 56 that is secured at its opposite ends to opposite ends of tube 29 and plates 33 and 36. Strap 56, as seen in FIG. 9, bows below tube 29 and is connected with a plurality of vertical connectors 57, 58, 59 and 60. Additional connectors may be used to join strap 56 to the bottom of tube 29. Strap 56 functions as a tension member when a load is placed on tube 29 and thereby minimizes the downward deflection of tube 29 when a header is carried by the tube.

Referring to FIGS. 3 and 4, there is shown detailed structure of swing arm assembly 32. Swing arm assembly 31 has the same structure as swing arm assembly 32 which is identified by the same reference numerals having a suffix A. Swing arm assembly 32 has a flat base or plate 38 that rests on the top of bolster 12. A pair of U-bolts 39, extended about bolster 12, secure plate 38 to bolster 12. An upwardly and outwardly inclined body 41 has a lower end secured to plate 38. The upper end of body 41 is attached to an upright brace or gusset 42 that extends downwardly and is secured to plate 38. Body 41 is inclined upwardly and outwardly at an angle of about 45 degrees relative to the horizontal plane of plate 38. Body 41 can have other angles relative to plate 38.

As seen in FIG. 4, body 41 is a tubular member having upright sides. A pair of upwardly-directed ears 43 and 44 are secured by welds and the like to opposite sides of body 41. Ears 43 and 44 project upwardly from the top plane of body 41 and accommodate an arm 46 joined to a generally horizontal sleeve 47. Sleeve 47 is a tubular member that surrounds head rest 28. Arm 46 is pivoted to ears 43 and 44 with a longitudinal pivot pin or bolt 49 which allows arm 46 along with head rest 28 to be pivoted, indicated by arrows 50, between an up position, shown in full lines in FIG. 3, to a down position, shown in broken lines. When the arm 46 is in the up position, sleeve 47 rests against the top wall portion 51 of body 41. When the arm 46 is in the down position, the sleeve 47 rests against a lower top wall portion 52 of body 41. Wall portions 51 and 52 are fixed stops and supports for head rest 28 and determine the up and down positions thereof.

Figure 5:
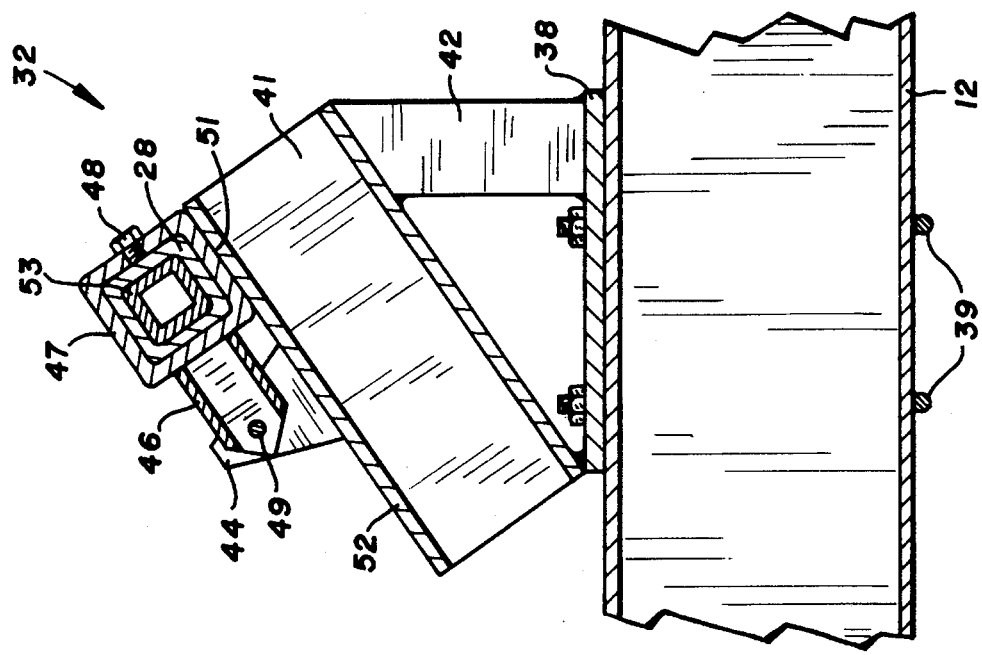
FIG. 5 is a sectional view taken along the line 5—5 of FIG. 4.

As shown in FIG. 5, a bolt 48, threaded into sleeve 47, secures head rest 28 to sleeve 47. Other structures, such as a bolt extended through sleeve 47 and adjacent holes in head rest 28, can be used to connect head rest 28 to sleeve 47.

As shown in FIG. 1, head rest 28 extends forwardly and rearwardly of bolsters 11 and 12. Tubular extensions 53 and 54 telescope into opposite ends of head rest 28 to further extend the effective length of head rest 28.

Figure 13:
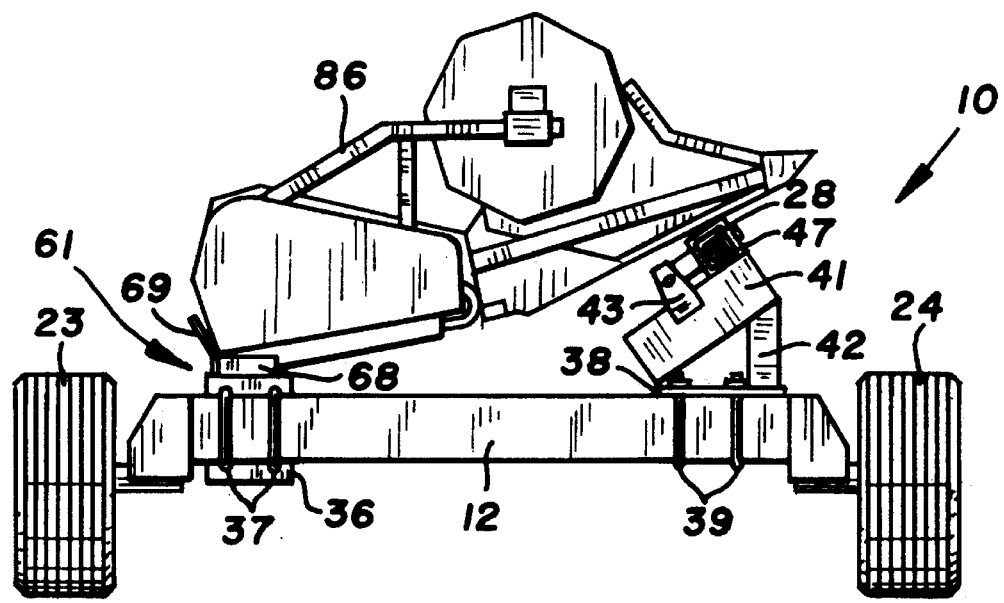
FIG. 13 is a conventional rear elevational view of the header trailer supporting a grain header of a combine.

Returning to FIG. 1, a pair of grain header stop bracket assemblies or holders 61 and 62 provide support for a grain header 86 of a combine, as shown in FIG. 13. Stop bracket assemblies 61 and 62 are identical structures that are secured to opposite end portions of support tube 29, as seen in FIG. 1. The following description is directed to stop assembly 61. The parts of stop bracket assembly 62 that correspond to the parts of stop bracket assembly 61 have the same reference numerals with the suffix A.

Figure 7:
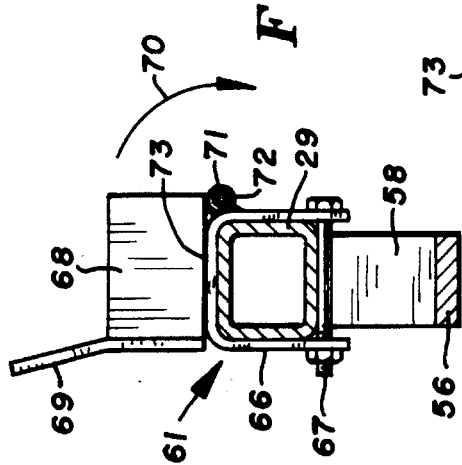
FIG. 7 is a sectional view taken along the line 7—7 of FIG. 6 showing the stop assembly in the up position.
Figure 8:
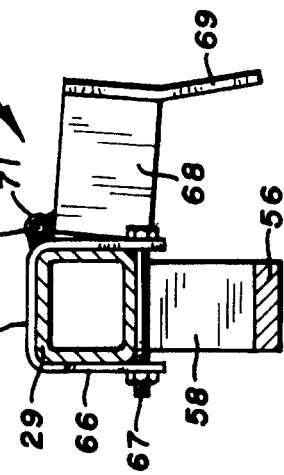
FIG. 8 is a sectional view similar to FIG. 7 showing the stop assembly in the down position.

Referring to FIGS. 6–8, stop assembly 61 has an inverted U-shaped bracket 66 located over tube 29 and attached thereto with bolts 67. Bracket 66 can be moved along the length of tube 20 to adjust its longitudinal location to accommodate different types and models of headers. A body or tubular member 68 extends transversely across bracket 66 and rests on top surface 73 of bracket 66, as seen in FIGS. 6 and 7. The outer end of body 68 has an upwardly-directed finger or stop 69. A hinge 71 secured to the lower inner end of body 68 is connected to bracket 66. A pivot member or bolt 72 pivotally connects body 68 to hinge 71 to allow the body to pivot to a down position, as indicated by arrow 70 and shown in FIG. 8.

Figure 14:
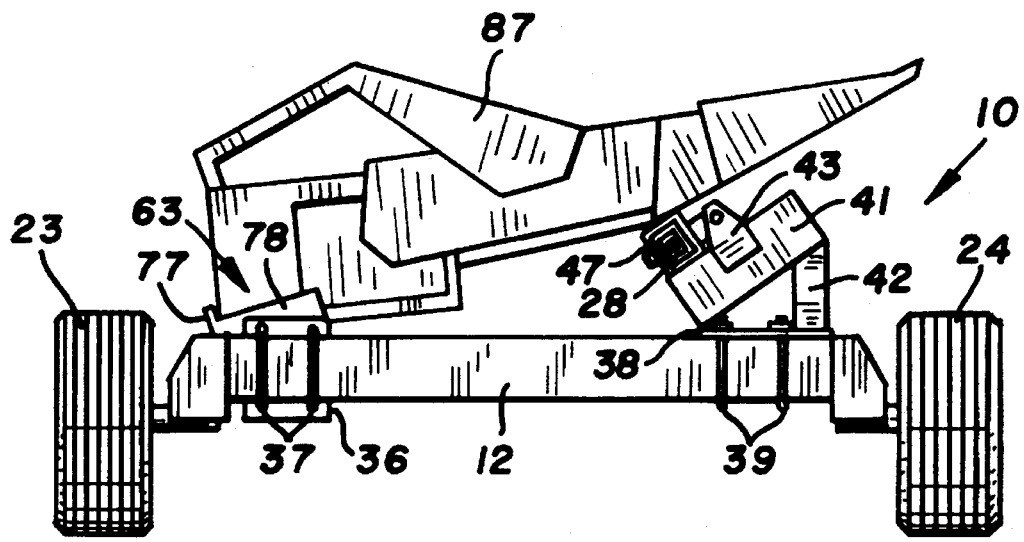
FIG. 14 is a conventional rear elevational view of the header trailer supporting a row crop header of a combine.

Returning to FIG. 1, a pair of row crop shoe assemblies or holders 63 and 64 are secured to support tube 29 between stop bracket assemblies 61 and 62. Row crop shoe assemblies 63 and 64 are substantially identical in structure and function. The following description is directed to row crop shoe assembly 63, which is used to support a row crop header 87 of a combine, as seen in FIG. 14. The row crop shoe assembly, as seen in FIGS. 10, 11 and 12, has an inverted U-shaped bracket 74 located about tube 29. Bolts 75 clamp bracket 74 to tube 29. Bracket 74 can be moved along the length of tube 29 to adjust its longitudinal location to accommodate different types and models of row crop headers. A shoe, indicated generally at 76, has an outer end having an upwardly-directed toe 77 and upright side walls 78 and 79. Side wall 79 is spaced inwardly from toe 77 providing a side opening 81. The top of shoe 76 is open to accommodate longitudinal and transverse frame members of row crop header 87. A hinge 82, having a pivot bolt or pin 83, pivotally connects shoe 76 to the inside portion of bracket 74 to allow the bracket to be located in an up position, as shown in FIGS. 10 and 11 and pivoted in the direction of the arrow 87 to a down position, as shown in FIG. 12.

As seen in FIG. 1, row crop shoe assembly 64A has a shoe 76A with the side opening faced inwardly or toward the shoe assembly 64. This provides transverse and longitudinal openings or channels for transverse and longitudinal portions of the opposite end of the row crop header.

In use, header trailer 10 can be used to transport either a conventional grain combine header 86, as seen in FIG. 13, or a conventional row crop header 87, as seen in FIG. 14. Headers 86 and 87 are known prior art structures used on combines and do not comprise any part of the invention. When header trailer 10 is used to transport the grain combine header, the head rest 28 is located in the up position, as shown in FIGS. 1, 3, 4, 5, 6, 7 and 13. The stop bracket assemblies 61 and 62 are also located in the up positions. The stop bodies 68 and 68A are generally horizontal with fingers 69 and 69A extended in an upward direction. The grain combine header has its forward end resting on head rest 29. The rear portion of header 86 rests on the bodies 68 and 68A and retain thereby the upright fingers 69 and 69A.

Header 86 is inclined downwardly toward the stop bracket assemblies 61 and 62 to minimize the lateral shifting of header 86 relative to head rest 28 and the bodies 68 and 68A. The wheels 13, 14, 23 and 24 of header trailer 10 have low profile tires which minimize the loading height required to place the grain combine header 86 on head rest 78 and stop bodies 68 and 68A. The row crop shoe assemblies 63 and 64 are placed in the down position, as shown in FIG. 12, so that they do not interfere with the utility of stop bracket assemblies 61 and 62.

As shown in FIG. 14, when row crop header 86 is transported by header trailer 10, the row crop shoe assemblies 63 and 64 are placed in the up positions, as shown in FIGS. 10 and 11. The head rest 28 is moved to the down position. The forward end of the row crop header 87 rests on the down head rest 78. The rear outer end portions of the row crop header 87 fit into the shoes 76 and 76A, thereby longitudinally and laterally holding the row crop header 86. The bodies 68 and 68A of the stop bracket assemblies 61 and 62 are moved to the down positions, as shown in FIG. 8 so that they do not interfere with the functioning of the row crop shoe assemblies 63 and 64.

We claim:

1. A vehicle for transporting a header of an agricultural harvesting implement comprising: a transverse front bolster, front wheel means connected to the front bolster to support the front bolster above the ground, steering means connected to the front bolster and front wheel means operable to turn said front wheel means to steer the vehicle, a transverse rear bolster, rear wheel means connected to the rear bolster to support the rear bolster above the ground, longitudinal tube means extended between said front and rear bolsters, means connecting said tube means to said front and rear bolsters to longitudinally locate the bolsters relative to each other, a longitudinal head rest extended between and located above said front and rear bolsters, a first swing arm assembly mounted on the front bolster and connected to the head rest, a second swing arm assembly mounted on the rear bolster and connected to the head rest, each swing arm assembly having an upwardly and outwardly inclined body, an arm pivotally connected to the body, means pivotally connecting the arm to the body, sleeve means connected to the arm accommodating the head rest, said sleeve means surrounding the head rest to support the head rest on the body, said arm and sleeve means being movable between an up location and a down location to selectively locate the head rest in an up position and a down position in engagement with the body, and holding means mounted on the tube means adapted to engage a portion of the header when the header is located on the head rest.

2. The vehicle of claim 1 wherein: the tube means is located in the horizontal plane of the front and rear bolsters.

3. The vehicle of claim 1 wherein: the tube means has a front end and a rear end, a plate secured to the front and rear ends of the tube means, said means connecting said tube means to said front and rear bolsters include bolt means associated with the plate to hold the plate in engagement with the adjacent bolsters.

4. The vehicle of claim 1 wherein: said tube means includes a longitudinal tube having opposite ends and a bottom wall, an elongated member located below the tube, means securing the member to the opposite ends of the tube, and connectors joining the member to longitudinally space portions of said bottom wall of the tube to limit downward deflection of the tube when a header is supported by the tube.

5. The vehicle of claim 1 wherein: each swing arm assembly has at least one ear secured to the body and extended upwardly adjacent the arm to accommodate the arm, and a horizontal longitudinal pivot member pivotally connecting the arm to the ear whereby the arm and sleeve means attached to the arm can be pivoted between its up and down positions in engagement with the body to change the location of the head rest relative to the swing arm assembly.

6. The vehicle of claim 5 wherein: the body of each swing arm assembly has upper and lower top wall portions on opposite sides of the ear, said sleeve means being engageable with the upper top wall portion when in the up position and engageable with the lower top wall portion when in the down position whereby the head rest is supported by the body in both the up and down locations of the head rest.

7. The vehicle of claim 1 wherein: the body of each swing arm assembly has upper and lower top wall portions, said sleeve means being engageable with the upper top wall portion when in the up position and engageable with the lower top wall portion when in the down position whereby the head rest is supported by the body in both the up and down locations of the head rest.

8. The vehicle of claim 1 wherein: each swing arm assembly includes a base, means securing the base to a bolster, means connecting said body to the base including an upright strut extended between the base and body, said at least one ear including a pair of upright ears secured to opposite sides of the body, and a longitudinal horizontal pivot member pivotally connecting the arm to the ears whereby the arm and sleeve means attached to the arm can be pivoted between its up and down positions in engagement with the body to change the locations of the head rest.

9. The vehicle of claim 1 wherein: said holding means includes a bracket mounted on the tube means, a body, an upwardly-directed stop finger secured to the body, and hinge means connecting the body to the bracket whereby the body can be pivoted between an up position above the bracket and a down position adjacent one side of the bracket, said body being in the up position to support a header on the body.

10. The vehicle of claim 1 wherein: said holding means includes a bracket mounted on the tube means, shoe means for accommodating a portion of the header, pivot means connecting the shoe means to the bracket for movement of the shoe means between an up position adjacent the top of the bracket, and a down position adjacent one side of the bracket, said shoe means being in the up position to support a header on the shoe means.

11. The vehicle of claim 10 wherein: the shoe means has upright side walls, an upright toe and a side opening.

12. A vehicle for transporting a header of an agricultural harvesting implement comprising: a front bolster, front wheel means connected to the front bolster to support the front bolster above the ground, steering means connected to the front bolster and front wheel means operable to turn said front wheel means to steer the vehicle, a rear bolster, rear wheel means connected to the rear bolster to support the rear bolster above the ground, longitudinal tube means extended between said front and rear bolsters to longitudinally locate the bolsters relative to each other, means connecting said tube means to said front and rear bolsters, a longitudinal head rest extended between and located above said front and rear bolsters, a first swing arm assembly mounted on the first bolster and connected to the head rest, a second swing arm assembly mounted on the rear bolster and connected to the head rest, each swing arm assembly having a body and means connected to the head rest and body movable between an up position and a down position to selectively locate the head rest in an up location and a down location in engagement with the body, and holding means mounted on the tube means adapted to engage a portion of the header when the header is located on the head rest.

13. The vehicle of claim 12 wherein: the tube means has a front end and a rear end, plate means secured to the front and rear ends of the tube means, said means connecting said tube means to said front and rear bolsters including bolt means associated with the plate means to hold the plate means in engagement with the adjacent bolsters.

14. The vehicle of claim 12 wherein: said tube means includes a longitudinal tube having opposite ends and a bottom wall, an elongated member located below the tube, means securing the member to opposite ends of the tube, and connectors joining the member to longitudinal spaced portions of said bottom wall of the tube to limit downward deflection of the tube when a header is supported by the tube.

15. The vehicle of claim 12 wherein: each swing arm assembly has an upwardly and outwardly inclined body, at least one ear secured to the body and extended upwardly therefrom, an arm located adjacent the ear, a horizontal longitudinal pivot member pivotally connecting the arm to the ear, sleeve means connected to the arm surrounding the head rest for supporting the head rest on the body, means securing the sleeve means to the head rest, said arm and sleeve means being movable between an up location and a down location in engagement with the body to selectively locate the head rest in an up position and a down position.

16. The vehicle of claim 15 wherein: the body has upper and lower top wall portions, said sleeve means being engageable with the upper top wall portion when in the up position and engageable with the lower top wall portion when in the down position whereby the head rest is supported by the body in both the up and down locations of the head rest.

17. The vehicle of claim 12 wherein: each swing arm assembly includes a base, means securing the base to a bolster, means connecting said body to the base including an upright strut extended between the base and the body, said at least one ear comprising a pair of upright ears secured to opposite sides of the body.

18. The vehicle of claim 12 wherein: said holding means includes a bracket mounted on the tube means, a body, an upwardly-directed stop finger secured to the body, and hinge means connecting the body to the bracket whereby the body can be pivoted between an up position above the bracket and a down position adjacent one side of the bracket, said body being in the up position to support the header on the body.

19. The vehicle of claim 12 wherein: said holding means includes a bracket mounted on the tube means, shoe means for accommodating a portion of the header, pivot means connecting the shoe means to the bracket for movement of the shoe means between an position adjacent the top of the bracket and a down position adjacent one side of the bracket, said shoe means being in the up position to support a header on the shoe means.

20. The vehicle of claim 19 wherein: the shoe means has upright side walls, an upright toe and a side opening.

21. A swing arm assembly mounted on a bolster of a vehicle for transporting a header of an agricultural implement and accommodating a head rest for supporting the header comprising: an upwardly-inclined body, means connected to the body adapted to be attached to the bolster for securing the swing arm assembly to the bolster, an arm pivotally connected to the body means and pivotally connecting the arm to the body, and a sleeve connected to the arm, said sleeve adapted to be connected to the head rest, said arm and sleeve being movable between an up position and a down position in engagement with the body to selectively locate the head rest in an up position and a down position.

22. The assembly of claim 21 including: at least one ear secured to the body and extended upwardly adjacent the arm, and a horizontal longitudinal pivot member pivotally connecting the arm to the ear whereby the arm and sleeve attached to the arm can be pivoted between its up and down positions in engagement with the body to change the location of the head rest.

23. The assembly of claim 22 wherein: the body has upper and lower top wall portions on opposite sides of the ear, said sleeve being engageable with the upper top wall portion when it is in the up position and engageable with the lower top wall position when it is in the down position whereby the head rest is supported by the body in both the up and down locations of the head rest.

24. The assembly of claim 21 wherein: the body has upper and lower wall portions, said sleeve being engageable with the upper top wall portion when in the up position and engageable with the lower top wall portion when in the down position whereby the head rest is supported by the body in both the up and down locations of the head rest.

* * * * *